United States Patent [19]
Retzky

[11] 3,725,647
[45] Apr. 3, 1973

[54] PHOTOGRAPHIC CREDIT CARD SYSTEM

[75] Inventor: Clarence M. Retzky, Wellesley, Mass.

[73] Assignee: Insta-Datic Corporation, Wellesley, Mass.

[22] Filed: Oct. 19, 1970

[21] Appl. No.: 81,698

[52] U.S. Cl. ..........................................235/61.12 R
[51] Int. Cl. ..............................................G06k 19/00
[58] Field of Search..235/61.12 R, 61.12 N, 61.11 E, 235/61.7 B

[56] References Cited

UNITED STATES PATENTS

| | | | |
|---|---|---|---|
| 3,245,697 | 4/1966 | Nugent | 235/61.7 B |
| 3,253,360 | 5/1966 | Spicer | 235/61.12 N |
| 3,536,894 | 10/1970 | Travioll | 235/61.7 B |
| 2,124,906 | 7/1938 | Bryce | 235/61.12 N |
| 3,325,632 | 6/1967 | Lilly et al. | 235/61.12 R |
| 2,206,206 | 7/1940 | Smith | 235/61.12 R |
| 3,111,887 | 11/1963 | Alexander | 235/61.12 R |

*Primary Examiner*—Daryl W. Cook
*Attorney*—Wolf, Greenfield & Sacks

[57] ABSTRACT

A credit card system which includes a transparent credit card bearing information identifying the credit card holder both in alphanumeric and digital notation. The card is used in conjunction with a conventional "IBM" record card which has been coated with a self-developing and self-fixing light sensitive film. In use, as at a retail sales location, the digital information portion of the credit card is aligned with a predetermined photosensitized portion of the record card. Information relating to the amount and/or character of the transaction is carried by an input device which may consist of a transparent card bearing the sales information both in alphanumeric and digital form. The input card is overlaid on the aligned "IBM" record card and credit card so that the digital information relating to the transaction is in alignment with another photosensitized segment of the record card. The cards are retained in their properly aligned configuration by a jig incorporated into a printer box which exposes the photosensitized record cards through the overlapping digital portions of the credit card and transaction card. After exposure and self-development, the imprinted record card then may be processed directly in commercially available data processing machines avoiding many of the manual conversion steps inherent in prior techniques. A sales receipt is provided for the customer and a sales stub is provided for the sales outlet simultaneously with exposure of the record card by providing a pair of similarly photosensitized, smaller tabs which underlie those overlapping portions of the credit card and transaction card bearing the alphanumeric, humanly readable information. The tabs may be formed integrally with and as a removable extension of the record card or, alternatively, may be separate from the record card.

13 Claims, 10 Drawing Figures

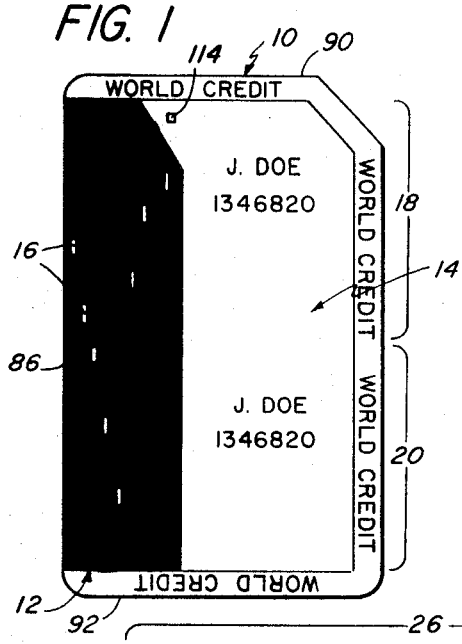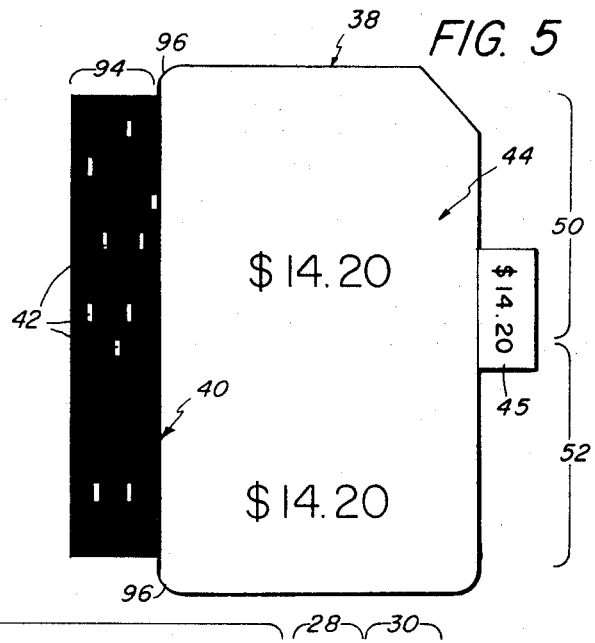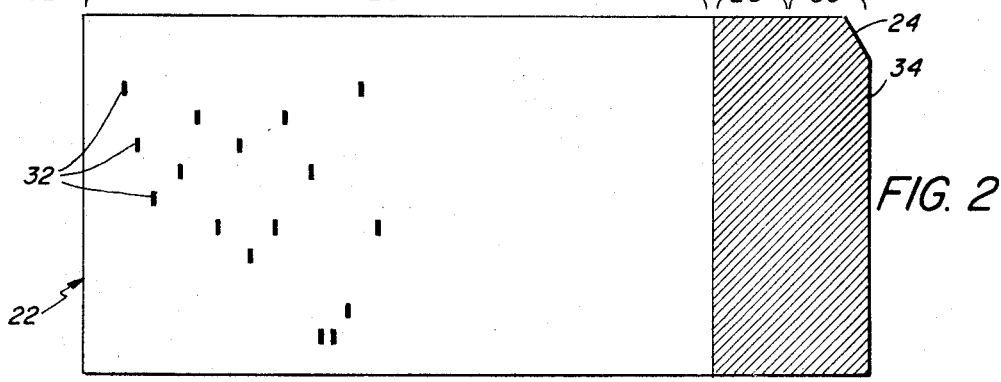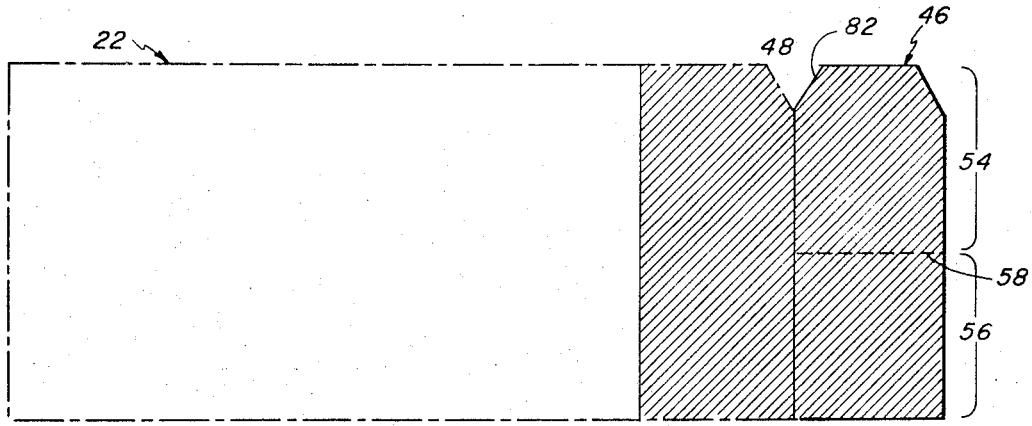

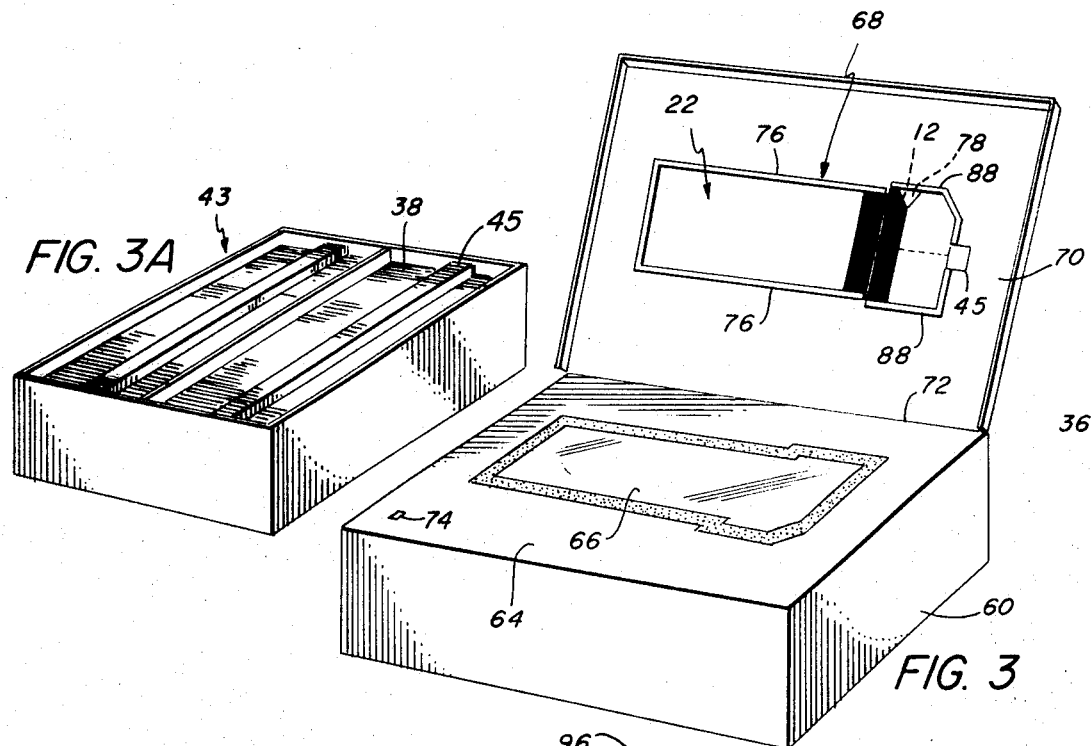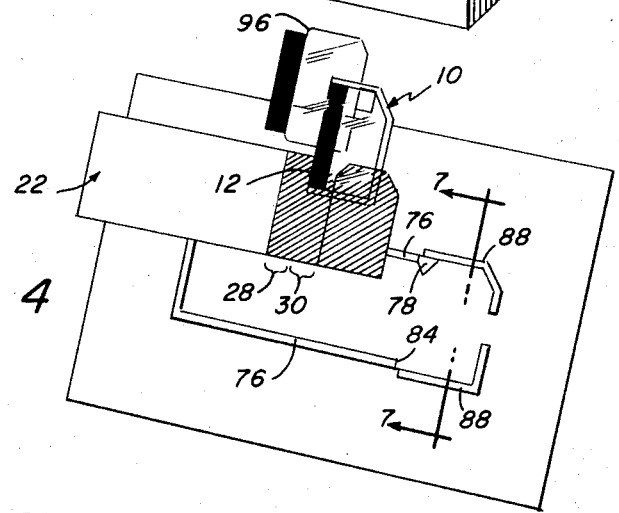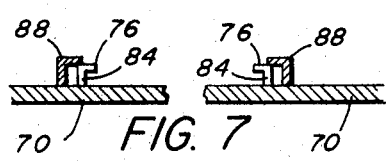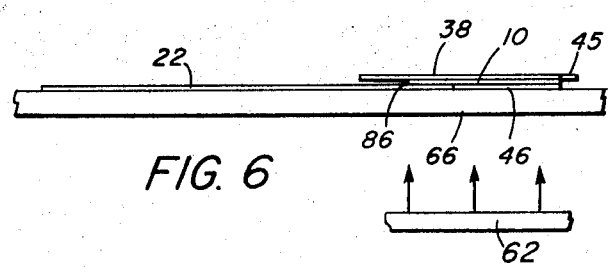

PHOTOGRAPHIC CREDIT CARD SYSTEM

BACKGROUND OF THE INVENTION

In recent years the use of credit and identification cards has become widespread and, as a result, a variety of credit card systems have been proposed and used. Perhaps the most commonly employed system is that in which the credit card is relatively rigid and has alphanumeric and/or digital information embossed directly in the card itself. A transaction is recorded by inserting the embossed credit card into a pressure printer which imprints the embossed credit card information onto a series of sheets which may be interleaved with carbon sheets. One of the imprinted sheets serves as a customer receipt and the other sheet or sheets are kept as sales records. The sales record information then is processed so that it may be handled by conventional computer systems.

Although the foregoing system has become quite popular, it does present a number of difficulties which, although not prohibitive, have resulted in a number of inefficiencies. For example, after the transactions have been recorded, the recorded information must be converted either manually or by optical scanning methods to a form which may be digested by a computer, such as magnetic tape or conventional "IBM" record cards. This requires that literally billions of bits of papers be sorted and processed which, in turn, increases materially the possibility of human error. A further difficulty encountered with the "embossing-type" credit card system is that the cards themselves are somewhat bulky and are awkward to carry, particularly when one has a number of such cards. Also among the difficulties encountered with the foregoing credit card system is that they do not lend themselves readily to a simple means for positively verifying the identity of the credit card holder. A further, not unimportant difficulty encountered with the embossed card systems is the rate at which they may be produced or replaced. It is among the primary objects of the invention to provide an improved credit card system which avoids the foregoing difficulties inherent in prior credit card systems and, more particularly, the foregoing system employing the embossed credit cards.

SUMMARY OF THE INVENTION

In brief, my credit card system employs a purely photographic system for recording the information relating to the sales transaction and the credit card holder directly on a photosensitized record card which then may be processed directly without requiring that the recorded information be converted to a medium which is acceptable by a conventional computer system. A standard "IBM" record card is provided with a self-developing, self-fixing photosensitive coating on a selected region thereof. The uncoated portion of the card preferably has been pre-punched or otherwise imprinted with digital information identifying the store, retail outlet or other invariable information. The record card is placed in a recording device which includes a jig arrangement for receiving the record card. When recording a transaction, a special transparent credit card is inserted into the jig which register the cards so that a portion of the credit card overlaps a portion of the coated surface on the record card. The overlapping portion of the credit card is opaque except for the bits of digital data (Hollerith coded punch-marks, or other types) which appear as small transparent areas identifying the credit card holder in digital form which is usable directly by the computer. The remaining portion of the transparent credit card projects beyond the edge of the record card and includes similar information identifying the credit card holder in alphanumeric, humanly readable form.

The information relating to the transaction itself, eg. price, goods sold, date, etc. may be stored in the form of transparent transaction cards which also are receivable in the jig. The transaction cards include a portion which overlaps another coated region of the record card. This overlapping portion of the transaction card also is opaque except for the bits of digital data which appear as small transparent regions which comprise the digital form of the information relating to the transaction. The remaining portion of the transaction card includes the same information in alphanumeric form. The jig is arranged to align the record card, transaction card and credit card so that the alphanumeric portions of the transaction card and credit card overlap each other and extend beyond the edge of the record card. The sandwiched cards then are exposed to an appropriate light or radiation source to which the photosensitive coating is responsive to imprint the digital information directly on the record card. The record card then may be used directly in the computer to print out bills, statements etc. without any conversion or cumbersome handling of paper.

The customer receipt is produced simultaneously with exposure of the record card. The customer receipt similarly is coated with the same photosensitive material as the record card and is located in the jig adjacent the end of the record card. The receipt may form an integral, easily separable extension of the record card itself. When the customer receipt is disposed properly within the jig, it underlies the overlapping alphanumeric-bearing portions of the credit card and transaction card. The information imprinted on the transaction and credit cards thus is imprinted on the customer receipt in readable script simultaneously with the exposure of the record card.

The credit cards themselves are fabricated in a photographic process which utilizes any of a number of commercially available high-speed photographic reproduction devices. These devices generally are capable of producing the cards at a speed which is considerably higher than that at which the conventional embossed cards currently are produced. Additionally, because the credit cards are produced by purely photographic means, the card may include a minute photograph of the credit card holder which can be examined at the store or retail outlet with an appropriate magnifying viewer to verify the identity of the person presenting the credit card.

It is among the primary objects of the invention to provide an improved credit card system in which the information relating to a transaction may be recorded immediately in a form which is usable directly by a computer without any intermediate steps.

Another object of the invention is to provide an improved credit card system which reduces paper-handling materially and, thus, the possibility of human error.

Another object of the invention is to provide an improved credit card system in which the credit cards themselves are extremely durable yet which are thin and occupy little space yet.

Still another object of the invention is to provide a credit card system which eliminates the more costly and cumbersome manifold, copy receipts and sales record slips which are employed in current embossed card systems.

A further object of the invention is to provide a credit card system and recording device therefor which provides visible, immediate verification that the sale has been recorded with the proper amounts and transaction information.

Still another object of the invention is to provide a credit card system in which cards may be updated and issued in a more quick, simple and less costly manner than has been heretofore available.

DESCRIPTION OF THE DRAWINGS

These and other objects and advantages of the invention will be understood more fully from the following detailed description thereof, with reference to the accompanying drawings wherein:

FIG. 1 is an illustration of a credit or identification card as might be used in the invention;

FIG. 2 is an illustration of a record card having selected regions thereof coated with a self-developing radiation-sensitive film;

FIG. 2A is an illustration of a record card with a detachable tab connected thereto and coated with a self-developing radiation-sensitive film;

FIG. 3 is an illustration of a printing box used in the invention;

FIG. 3A is an illustration of a transaction card file for holding transaction cards bearing variable information;

FIG. 4 is an illustration of the cover of the printing box in FIG. 3 and showing the juxtaposed cards and the frame for orienting the cards in proper juxtaposition;

FIG. 5 is an illustration of a typical transaction card;

FIG. 6 is an elevation, in section, through the juxtaposed cards when pressed flat against each other in the printing box;

FIG. 7 is a sectional view of the card-holding frame as seen along the line 7—7 of FIG. 4.

DESCRIPTION OF THE PREFERRED EMBODIMENT

Figure 8:
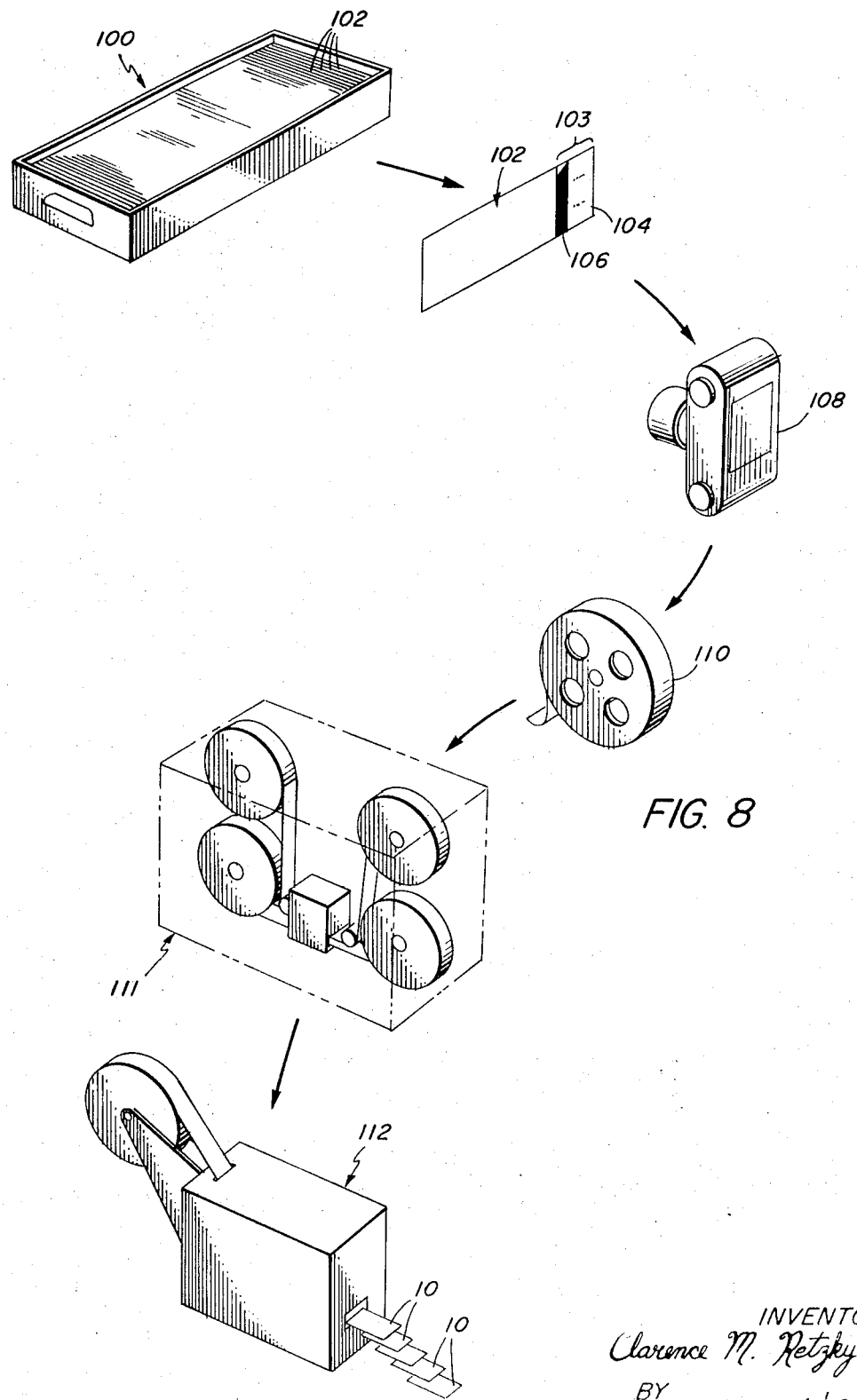
FIG. 8 is a flow chart illustrating the manner in which the credit or identification cards may be fabricated.

FIG. 1 is an illustration of a typical credit card 10 which is fabricated, in a manner described herein, from a thin plastic sheet approximately 7 mils thick. Any of a variety of commercially available durable plastic bases, such as poly (ethylene terephthalate) may be employed in fabricating the card such as Mylar which is available commercially from the E. I. Dupont de Nemours and Co., Inc. A variety of other plastic materials also may be employed such as cellulose acetate, ethyl cellulose, etc. The plastic base of the credit card is substantially transparent and bears photographically imprinted information which identifies the credit card holder. In the preferred embodiment of the invention, the credit card 10 is divided into a first, digital region 12 and a second, alphanumeric region 14. The digital region 12 is primarily opaque except for transparent windows 16 which are disposed in an arrangement which identifies the credit card holder in digital form. The alphanumeric region 14 is substantially transparent and presents the credit card holder's identification in alphanumeric, humanly readable form. Additionally, the alphanumeric region 14 may be subdivided into an upper region 18 and a lower region 20 which bear the alphanumeric information in duplicate.

The credit card 10 is used in conjunction with a record card 22 (see FIG. 2) which preferably is in the form of the well-known "IBM-type" machine controlling card having the usual eighty vertical columns of recording positions with each column containing ten or twelve positions. The record card 22 is of the standard dimensions which currently are employed in practically all commercially available record card handling devices. The card 22 includes the usual clipped corner 24 for aligning the card 22 with other cards or with the card handling apparatus. For ease of explanation, the record card 22 will be considered as being divided into three segments, the first segment 26 including the majority of the columns on the card, the second segment 28 and third segment 30 including the remaining columns at the end of the card. The number of columns included in each of the segments 26, 28, 30 may be varied depending on a general type of transaction which are to be recorded. Typically, the first segment 26 will include non-variable, pre-recorded information which identifies the retail outlet or other location at which the record card 22 is used. This information may be recorded by: (1.) Conventional "gang-punch," data-card reproduction methods, or (2) By imprinting opaque marks 32 on the card in place of the usual punched hole in order to permit optical reading, or (3) By photo-sensitizing the entire card and recording the non-variable data at time of sale (in the same manner prescribed for recording variable data) by use of an additional transparency data-card bearing the repetitive, fixed-data information. The second and third segments 28, 30 of the card 22 are unmarked and are intended to record and receive the information relating to a particular transaction.

The second and third segments 28, 30 of the record card 22 are coated with a film of light sensitive material as suggested at 34. The light sensitive film 34 preferably has special properties of forming an instantly visible permanent image without requiring any processing when exposed to radiation of predetermined characteristics, such as ultra-violet light. For example, photosensitive materials having the desired characteristics are available commercially from the E.I. DuPont de Nemours Corp. and are marketed under the trademark of trade name DYLUX.

As shown in FIGS. 3 and 4, the information relating to a particular sales transaction is recorded by inserting the sensitized record card 22 and the credit card 10 into a printer 36. The record card 22 and credit card 10 are juxtaposed so that the digital region 12 of the credit card 10 overlaps the sensitized third segment 30 of the record card 22. Thus, by subsequently exposing the juxtaposed cards, 10, 22 to ultraviolet radiation, the digital information represented by the position of the windows 16 on the credit card 10 will be imaged permanently on a predetermined region on the record card 22.

In order to include the variable information relating to the particular transaction, such as price, character of goods or services sold, the nature of the transaction, etc., a series of transaction cards 38, such as that shown in FIG. 5, may be provided. Each transaction card 38 also is divided into a substantially opaque digital region 40 having transparent windows 42 which are arranged to present the sales information relating to the particular transaction card in digital form. The transaction card 38 also includes a substantially transparent alphanumeric region 44 which bears the identical information in humanly readable alphanumeric notation. The transaction card 38 is dimensioned in relation to the credit card 10 and record card 22 so that all three cards may be juxtaposed in the printer 36 with the digital region 40 of the transaction card 38 being disposed over the second segment 28 of the record card 22 as suggested in FIGS. 3 and 4. Thus, when the credit card 10, record card 22 and transaction card 38 are positioned properly within the printer 36 and are exposed, the digital information corresponding to the position of the windows 16, 42 in the credit card 10 and data card 38 will be permanently recorded in the proper position on the record card 22. A file 43 (FIG. 3A) consisting of a plurality of such transaction cards is kept in the store retail outlet. The cards 38 preferably have integral index tabs 45 to facilitate their selection from and replacement in the file 43.

After the transaction has been recorded the record card 22 includes all digital information necessary to identify the location of the transaction, the amount and nature of the transaction and the identification of the credit card holder, all in digital form, which may be utilized directly by a computer to provide billing statements and to assist in other accounting functions as is well-known to those skilled in the information handling art.

The invention also provides for producing a customer receipt and sales record simultaneously with the recording of the digital information on the record card 22. For this purpose, a tab 46, shown in FIGS. 2A and 4 is provided either separately from or connected to the end of the record card 22. When the tab 46 is connected to the record card 22, they may be separated by a score line 48 to facilitate separation of the tab 46 as described below. The tab 46 is dimensioned in relation to the record card, credit card 10 and data card 38 so that when these cards are properly juxtaposed in the printer 36 the tab 46 will be in alignment with the substantially transparent and overlapping alphanumeric regions 14, 44 of the credit card 10 and data card 38 respectively. It should be noted further that the alphanumeric information on the regions 14, 44 of the credit card 10 and data card 38 are disposed in non-interfering relation with each other so that all of the alphanumeric information from both cards may be imprinted in duplicate clearly on the photosensitive coating on the tab 46.

As shown, the transaction card 38 may be considered as having an upper region 50 and a lower region 52 which bear duplicate alphanumeric notation. Similarly, the tab 46 also is divided into an upper region 54 and a lower region 56. When exposed, the alphanumeric information on both the transaction card 38 and credit card 10, is imprinted in duplicate on the upper and lower regions 54, 56 of the tab. The upper and lower tab regions may be distinguished by a horizontal score line 58 which facilitates their easy separation so that one may be used as a customer receipt and the other may be employed as a permanent record at the retail outlet or sales location.

The printer 36 is of relatively simple construction and may take the form shown in FIG. 3. This embodiment includes a housing 60 which encloses an appropriate radiation source for exposing the photosensitive coating and causing the permanent image to be formed on the record card 22. With the DYLUX coating referred to above, the radiation source will consist of a conventional ultra-violet light. The light is directed toward a wall 64 of the housing in which an exposure window 66 is provided. The exposure window 66 may consist of a sheet of transparent glass or plastic. The credit card 10, record card 22 and data card 38 are retained in properly juxtaposed position by a retaining frame 68 on the inner surface of a cover 70 which is hinged to the housing 60 along the hinge line 72 to enable the cards 10, 22, 38 to be pivoted downwardly in flat engagement with the exposure window 66 in readiness for exposure as shown in FIG. 6. The area circumscribed by the frame 68 is built-up slightly by a layer of soft, yet resistant cushioning material 73 (such as foam-rubber, felt or polyurethane foam) so that firm pressure will be exerted against the exposure window 66 when the lid 70 is closed, causing the sandwiched cards between to lie flat and ensure proper registration. The radiation source 62 may be operated by a switch 74 which extends upwardly of the housing 60 and is depressed by the cover 70 when the cover is closed.

The frame 68 for holding the various cards in proper juxtaposed position may take a variety of forms with the arrangement shown in the drawings being illustrative. As shown in FIG. 7 the frame 68 includes a pair of spaced gibs 76 which receive the longitudinal edges of the record card 22. The longitudinal position of the record card 22 may be determined by a stop engageable with an end of the record card 22, such as the boss 78. When the tab 46 is connected integrally to the card 22, positioning of the card 22 will be sufficient also to simultaneously properly position the tab 46. In the event that the tab 46 is separate from the record card 22, additional means should be provided to position the tab 46 properly in relation to the other cards. For example, as shown in the drawings, this arrangement can take the form of the boss 78 raised slightly from the surface of the cover 70 which is engageable with the clipped corner 24 of the record card 22 and a similarly clipped edge 82 of the tab 46. After the record card 22 and tab 46 have been properly positioned in the frame, the credit card 10 and data card 38 then are inserted into the frame in their properly juxtaposed overlapping relationship described above.

In the preferred embodiment, the credit card 10 is of a length greater than the width of the record card 22. The gibs 76 are designed to define an abutting surface 84 against which the edge 86 of the credit card may be placed to register properly the digital region 12 of the credit card 10 over the photosensitive third segment 30 of the record card 22. The credit card 10 is retained in place by a pair of spaced gibs 88 secured to the underside of the cover 70 which engage the upper and lower edges 90, 92 of the credit card 10. The transaction card 38 preferably has the same heightwise dimension as the credit card 10 so that it, too, may be retained in place within the gibs 88.

The substantially transparent alphanumeric region of the transaction card 38 occupies an area which is substantially equal and coextensive to that of the complete credit card itself. The substantially opaque digital region 40 of the transaction card is formed on a tab 94 which projects beyond the digital region 12 of the credit card in overlapping relation with the second segment 28 of the record card 22. The tab 94 preferably has a heightwise dimension which is less than that of the heightwise dimension of the data card 38 to define shoulders 96 which engage the abutting surface 84 to register the transaction card 38 properly.

FIG. 8 shows, somewhat schematically, the manner by which the credit cards 10 may be produced. The preferred technique includes providing a master file 100 of customer record cards 102 which are of standard dimensions and configuration adapted for use with conventional computer card sorting and handling devices. Each of the customer record cards 102 includes information relating to and identifying the customer. One end of the customer record card 102 is imprinted with an exact replica 103 of the credit card 10 and includes the alphanumeric portion 104 and the digital portion 106. The credit card 10 is produced by photographing the regions 104, 106 of the record card 102, as by an automatic high-speed copying camera 108. The exposed film roll 110 which may bear a large number of negative photographic images of a corresponding number of customer record cards 102, then is developed according to conventional techniques. The developed negative images then are transferred to the more durable plastic base such as Mylar or Kronar as by a negative to positive roll to roll film reproducer 111. A variety of such reproducers are available commercially, for example, as from the Eastman Kodak Co. of Rochester, N.Y. The reproduced durable positive roll then is passed through a film cutter 112 which severs the individual credit cards. In the preferred embodiment, the individual credit card thereafter is laminated with an additional, thin transparent plastic layer or coating to cover the emulsion surface of the credit card to protect that surface. The foregoing technique may be employed to produce new, additional or replacement credit cards at a relatively high rate which is considerably faster than the reproduction rate currently employed with the well-known embossed type credit cards. The provision of the credit card image directly on the customer record card 102 enables the cards 102 to be retrieved and selected automatically and at high speed by conventional card sorting and handling devices.

A further feature of the system is that because the credit cards are produced in a photographic technique identifying information may be included in the completed credit card automatically, for example, the master customer credit cards 102 may include a minute photograph or other identification of the credit card holder which is reproduced automatically on the credit card through the photographic process. When using the credit card in any sales transaction, the seller may verify the identity of the credit card holder by inspecting the photochipia through a properly aligned enlarger-viewer which is located in proximity or may be formed integrally with the printer housing 60. The identifying chip 114 should be small enough and/or disguised by chaff so that it is not readably discernable to the unaided eye.

Thus, I have provided an improved credit card system which permits a sales or other transaction to be recorded directly on a record card which permits direct entry into a computerized accounting system and which avoids the intermediate steps which have heretofore been required to convert the recorded information to computer acceptable language. Additionally, the system reduces the possibility of human error. The credit cards themselves are fabricated by a high-speed photographic technique which permits their production or reproduction at a rate which is considerably higher than that of conventional embossed type credit cards. It should be understood, however, that the foregoing description of the invention is intended merely to be illustrative thereof and that other embodiments and modifications may be apparent to those skilled in the art without departing from its scope which is defined in the appended claim.

Having thus described the invention, what I desire to claim and secure by Letters Patent is:

1. A record card for storing information in digital, coded form, said card being dimensioned and adapted to be handled and processed directly by card handling apparatus, said card further comprising:
   at least a portion of said card being coated with a self-developing, photosensitive material adapted to form a permanent, visible image when exposed to radiation of predetermined characteristics; and
   a tab detachably connected to said card, said tab being coated with said photosensitive material.

2. A record card for storing information in digital coded form, said card being dimensioned and adapted to be handled and processed by card handling apparatus, said card further comprising:
   at least a portion of said card being coated with a self-developing, photosensitive material adapted to form a permanent, visible image when exposed to radiation of predetermined characteristics;
   said card including three segments, the first segment thereof having coded information prerecorded in computer-comprehendible code, said second and third segments being free of recorded data and being coated with said photosensitive material.

3. A system for recording information both in a coded form capable of direct comprehension by a computer card handling machine and in a visually readable form comprising: p1 A credit card having a radiation transparent portion and a radiation opaque portion, said radiation transparent portion having opaque visually readable information thereof and said radiation-opaque portion having a plurality of transparent windows formed therein and arranged in a coded array of digital information corresponding to said visually readable information;
   a record card having at least a portion thereof coated with a photosensitive material adapted to form a permanent visible image upon exposure to said radiation of predetermined characteristics;
   a tab coated with said photosensitive material;

means for retaining said record card and said tab in fixed predetermined position in relation to each other;

means for retaining said credit card in overlapping engagement with said coated portions of said record card and said tab, said retaining means for said record card, tab and credit card being so constructed and arranged as to effect registration of the digital portion of said credit card with said photosensitized portion of said record card and to effect registration of said substantially transparent portion of said credit with said photosensitive tab; and means for exposing simultaneously said record card and tab to said radiation.

4. A system as defined in claim 3 wherein said coated portion of said record card occupies two adjacent regions of said record card, said digital portion of said credit card overlying one of said regions and further comprising means for recording variable information on said record card and tab comprising:

means for simultaneously overlapping the other of said coated regions on said record card with a substantially radiation-opaque member having radiation transparent windows arranged in coded digital form and for overlapping the transparent region of said credit card and tab with a substantially radiation transparent region having visually readable notation thereof in radiation opaque form.

5. A system as defined in claim 4 wherein said means for recording said variable information further comprises:

a transaction card having a portion substantially transparent to radiation and a portion substantially opaque to radiation, said transparent portion defining a region which is substantially coextensive with the dimensions of said credit card, said opaque region of said data card extending beyond the edge of said credit card and over the other of said photosensitized regions of said record card.

6. A system as defined in claim 5 wherein said visually readable information on said substantially transparent region of said data card is so located as to be in proximity to but in non-interferring position with the readable information on said credit card when said cards are juxtaposed in said predetermined position.

7. A system as defined in claim 3 wherein said means for retaining said cards in position comprises:

a member;

a frame including a pair of parallel gibs receptive to the longitudinal edges of said record card;

abutting means secured to said member for engaging an end of said record card to position said record card longitudinally with one end of said record card extending longitudinally beyond an end of said gibs;

a second pair of parallel gibs located at one end of said first pair of gibs, said second pair of gibs being spaced in an amount greater than the spacing of said first pair of gibs;

said credit card having longitudinal dimensions greater than the heightwise dimension of said record card, the edges of said credit card being receivable within said second pair of gibs with an edge of said credit card being in abuttment with the ends of said first pair of gibs.

8. A system as defined in claim 7 further comprising:

a transaction card having a substantially transparent portion and a substantially opaque portion, said transparent portion defining a region which is substantially coextensive with the dimensions of said credit card, said opaque region of said transaction card extending beyond the edge of said credit card, said opaque region of said transaction card comprising a tab of reduced heightwise dimension adapted to fit between said first pair of gibs in overlapping relation with a portion of said photosensitized record cards, said transaction card being positioned properly in relation to said credit card and said record card by reason of engagement of heightwise extending surfaces thereof abuttable with the ends of said first pair of gibs.

9. A system as defined in claim 7 further comprising:

a housing;

said member comprising a flat cover hinged to said housing for pivotal movement toward and away from a wall of said housing;

said housing including an internal source of radiation; and a transparent flat pressure window in said wall of said housing to press said retained cards and tab into firm, flat overlapping engagement with each other to permit exposure of said record card and tab.

10. A system as defined in claim 9 wherein said housing further comprises:

switch means responsive to closure of said cover for actuating said radiation source.

11. A technique for producing identification cards and the like comprising:

providing a master record card of dimensions suitable for use in association with card sorting and handling devices;

said master record card having a first region bearing identifying information in digital form and a second region bearing a photographable image of said identification card, said photographable image in said second region of said master record card including identifying information in digital form corresponding to said digital identifying information on said first region of said master record card;

photographing said photographable image of said identification card, and;

photographically reproducing said photographed image on a thin, flexible durable base.

12. A technique for producing identification cards as defined in claim 11 wherein said step of providing said master record card comprises retrieving a plurality of said master record cards from a master file thereof in a selected sequence and by reference to said identifying information on said first region of said master record cards, said step of photographing said photographable image of said identification cards comprising:

photographing the photographable image on each of said master record cards in said selected sequence and in succession on a film strip; and severing said photographically reproduced images on said thin, flexible and durable base from each other to provide a plurality of distinct identification cards.

13. A technique as defined in claim 11 wherein said photographically reproduced image on said thin, flexible durable base is embodied in a photographic emulsion coating on one surface of said base and further comprising applying a thin, transparent protective plastic layer to said emulsion surface of said base to protect said emulsion surface.

* * * * *